March 6, 1951     E. R. HATHEWAY, JR     2,543,909
SPOUT WITH SPACED, FLEXIBLE, PERIPHERAL FLANGES, RELEASABLY
CONNECTIBLE TO THE RIM OF A CARTON OPENING
Filed Sept. 23, 1946
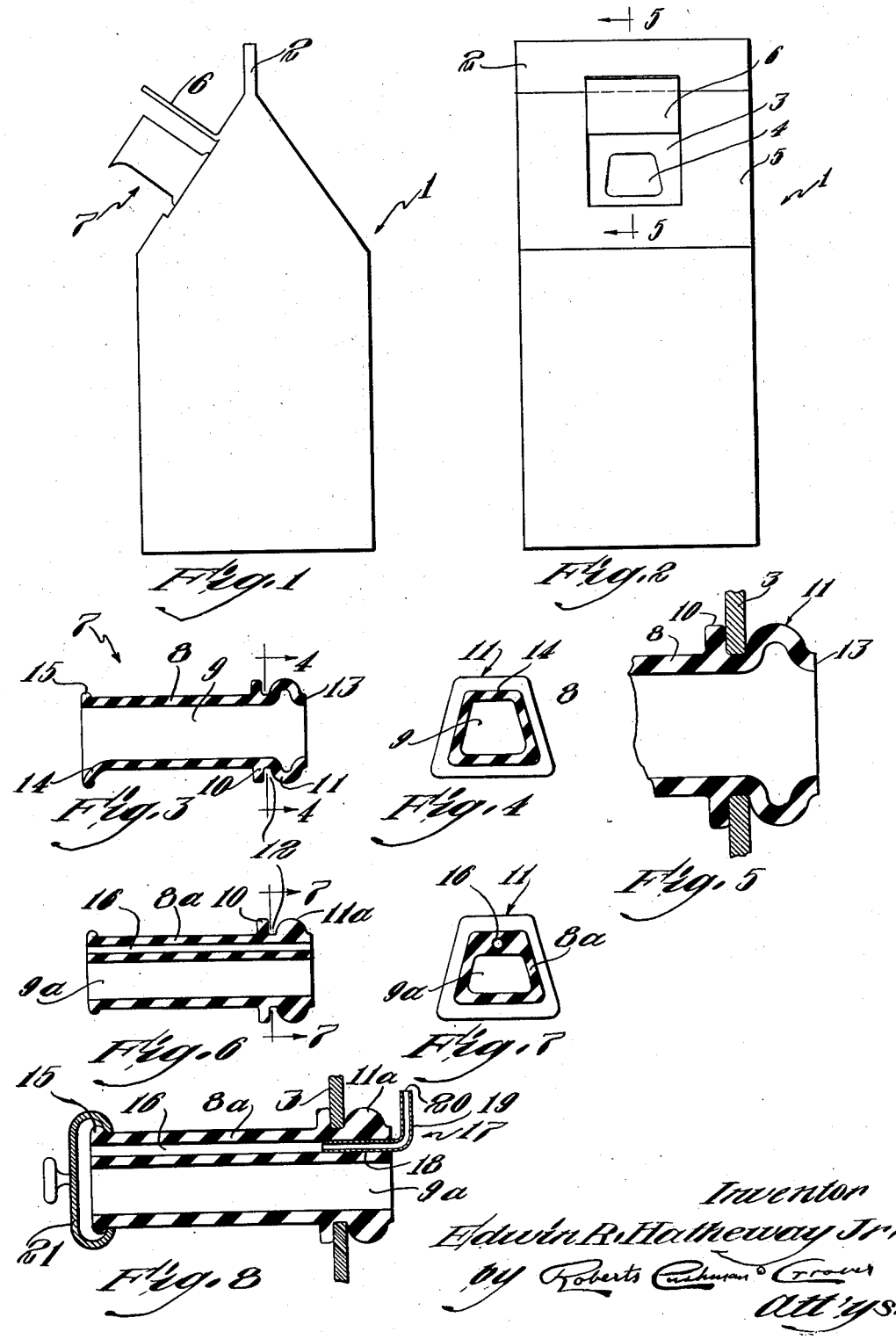
Inventor
Edwin R. Hatheway Jr.
by Roberts Cushman Crowe
Att'ys Patented Mar. 6, 1951

2,543,909

UNITED STATES PATENT OFFICE 2,543,909

SPOUT WITH SPACED, FLEXIBLE, PERIPHERAL FLANGES, RELEASABLY CONNECTIBLE TO THE RIM OF A CARTON OPENING

Edwin R. Hatheway, Jr., Newbury, Mass.

Application September 23, 1946, Serial No. 698,649

3 Claims. (Cl. 222—479)

This invention pertains to delivery spouts for liquid dispensing containers and more especially to a spout applicable by the user to a cardboard or similar container, such as is commonly employed in the delivery of milk to the consumer. Containers of this kind usually have a pouring opening, commonly of polygonal contour, which is covered by a flap or other closure at the time of delivery, the flap or closure being removed or turned back by the user to expose the opening. However, as the pouring opening is a mere aperture in a substantially flat surface and since the container has no vent other than this aperture, it is difficult to pour out the contents in a smooth, steady stream. The tendency is for the milk to run down the outer surface of the container. This wastes the milk, washes dust and dirt from the outer surface of the container into the vessel into which the milk is being poured, and the dribble of milk from the container bottom wets the hand of the user.

One object of the present invention is to provide a pouring spout readily applicable to cardboard or similar fluid containers and by means of which the fluid may be poured freely and without waste or tendency to dribble. A further object is to provide a pouring spout so devised as to provide a vent passage through which air may enter the container as the liquid is poured out. A further object is to provide a pouring spout of very simple and inexpensive type which is sanitary, easily cleaned and sterilized, and which fits leak-tight into the pouring opening in the container when inserted therein. A further object is to provide a pouring spout comprising means for closing it temporarily in the intervals between the delivery of milk from the container. Other and further objects and advantages of the invention will be pointed out in the following more detailed description and by reference to the accompanying drawings wherein Fig. 1 is a diagrammatic end elevation of a dispensing container provided with the pouring spout of the present invention;

Fig. 2 is a front elevation of the container shown in Fig. 1 but omitting the pouring spout;

Fig. 3 is a longitudinal section, to large scale, illustrating one embodiment of the pouring spout of the present invention;

Fig. 4 is a transverse section on the line 4—4 of Fig. 3;

Fig. 5 is a fragmentary section, to larger scale, on the same plane as Fig. 3 showing the inner or base portion of the spout fitted into the pouring opening in the container;

Fig. 6 is a view similar to Fig. 3 but illustrating a spout of modified construction;

Fig. 7 is a section on the line 7—7 of Fig. 6; and

Fig. 8 is a section, generally similar to Fig. 6, showing a further modification, the spout being mounted in the pouring opening in the container wall.

Referring to the drawings the numeral 1 designates a dispensing container of a type commonly employed in the distribution of milk. These containers are usually made of cardboard properly treated to make them impervious to moisture and to prevent leakage. The container here shown for illustration (but without limitation as to the utility of the spout of the present invention) has upwardly sloping top walls which merge with a handle portion 2. One at least of these upwardly converging top walls comprises two thicknesses of the material, an outer ply 5 and an inner ply 3, the latter (Fig. 2) having therein a pouring opening 4, which may be of any shape, as determined by the maker of the container. This opening, as here illustrated, and as is customary in containers of this kind, is polygonal, the opening shown being substantially trapezoidal with rounded corners. The outer ply 5 of this sloping top wall is provided with a hinged flap portion 6 which normally covers and conceals the pouring opening 4. Usually this flap is temporarily held in place by some adhesive means, for example paraffin or the like, but is lifted, as shown in Fig. 1, by the user preparatory to pouring out the liquid from the container. With such an arrangement considerable difficulty is experienced in pouring the milk or other liquid from the container through the pouring opening 4, since this opening is in a flat wall of thin material. Such an opening does not have the characteristics of a smooth flow orifice, and the milk tends to cling to the container wall and dribble rather than to flow in a solid stream. For this reason much objection has been made to containers of this type.

In accordance with the present invention a pouring spout 7 is provided which may be inserted into the opening 4 by the user preparatory to pouring out the contents of the container. This spout is preferably a unitary mass of the selected material and may be made by a simple moulding operation such as is commonly employed in the making of small rubber or synthetic resin articles. Preferably this spout is made of vulcanized rubber and is quite soft and resilient, the softness and resiliency being comparable to that of the usual nursing bottle nipple. Instead of natural rubber, artificial rubber may be used or some of the synthetic plastics providing they have the requisite resiliency; that they are impervious to moisture; capable of employment for this purpose in a practical and economical way, and preferably capable of withstanding a sterilizing process without deterioration.

As illustrated in Figs. 3, 4 and 5, the spout is of tubular construction comprising an elongate body portion 8 defining the delivery passage 9. This spout also comprises a base portion including the radial flange 10 and a second flange or enlargement 11, here shown as a hollow bead or rib, spaced from the flange 10, so as to provide an annular peripheral groove 12. The rib 11 terminates, as shown at 13. The outside dimensions of the portion 13 are preferably somewhat less than the dimensions of the pouring opening 4, so that the part 13 constitutes a pilot lip which may be thrust into the opening 4 preparatory to pushing the rib 11 completely through the opening.

The base portion of the spout is preferably of substantially the same contour, in transverse section, as that of the pouring opening 4. At least that portion of the wall of the spout which defines the bottom of the groove 12 is of this contour, the dimensions of the bottom wall of the groove 12 being such that when the material of the wall 3 of the container which borders the opening 4 is seated within this groove 12, the bottom wall of the groove will bear against the edge of the opening with resilient pressure sufficient to provide a leak-tight joint. The shape of the rib or bead 11 is such that when the base portion of the spout is pushed through the opening 4, the bead 11, in expanding, tends to crowd the material of the wall 3 against the inner surface of the flange 10, thus further assuring a leak-tight joint between the parts. When the spout is thus disposed in the opening, the flanges 10 and 11 constitute retaining elements which hold the spout in place during use, although by exerting sufficient pull on the outer portion of the spout, it may readily be withdrawn from the pouring opening.

Preferably the outer end of the spout is provided with a downwardly directed pouring lip 14 and with an external bead 15.

In Figs. 6, 7 and 8 slight modifications are illustrated. Thus in Figs. 6 and 7 the spout, although in most other respects like that previously described, has, in addition to the delivery passage 9a, an air vent passage 16 parallel to the passage 9a, but preferably of substantially smaller cross section. In this instance the bead or flange 11a is shown as solid. The vent passage 16 extends from one end to the other of the spout and when the spout is mounted in the opening in the container wall and the liquid flows out through the passage 9a, air is free to enter through the passage 16, thus venting the container so that the flow of fluid is free and unimpeded by atmospheric pressure.

In Fig. 8 the vent passage 16 is shown as provided with an extension 17 consisting, for example, of a length of small diameter tubing, for instance glass, stainless steel or a plastic, comprising the portion 18 which is axially aligned with the passage 16 and embedded in the base portion of the spout and the delivery portion 19, here shown as at right angles to the part 18, and which terminates at 20. With this arrangement the terminal point 20 is disposed well above the level of the liquid in the container during the pouring operation so that the air is free to enter without danger that the vent will be overflowed by the fluid. In Fig. 8 the pouring spout is shown as provided with a detachable cover or cap 21, which engages the end flange 15 of the spout and which may be used to close the spout during periods when the spout is not in use.

When herein reference is made to a tubular spout the term "tubular" is not intended to signify a spout of any particular transverse section.

While certain desirable embodiments of the invention have been illustrated and while certain materials have been suggested as useful in making the spout, it is to be understood that the invention is not limited in respect to these details except as defined by the appended claims.

I claim:

1. In combination with a cardboard beverage container having a pouring opening in its wall, an attachable tubular spout for application to a filled container, and detachable following depletion of the container for use with another filled container to facilitate pouring a liquid therefrom, said spout having a continuous elastic bounding wall, defining a longitudinal pouring passage, spaced radially extending elastic anchoring flanges near one end of the spout formed integral therewith, adapted to embrace the wall of the container bordering the opening, one of said flanges being adapted to be forced through the opening and having at its outer end extremity a pilot lip of small enough diameter to enter the opening a substantial distance without squeezing, said pilot preceding the flange into the opening and increasing in diameter as it merges with the flange, said radial flanges being normally spaced apart along the spout by a distance less than the thickness of the container wall bordering the opening but being longitudinally distendable to increase the space therebetween by stretching the material of the spout between the flanges to permit the marginal portion of the bounding wall to be entered between the flanges and to be gripped therebetween by the tendency for the flanges elastically to return to their normal position.

2. A tubular pouring spout for use with a container according to claim 1, wherein the outer one of the radial flanges has an internal annular groove therein.

3. A tubular pouring spout for a container according to claim 1, wherein a portion of the wall longitudinally of the spout is thicker than other portions and has extending therethrough a continuous passage parallel to the pouring passage which constitutes a vent tube.

EDWIN R. HATHEWAY, Jr.

REFERENCES CITED

The following references are of record in the file of this patent:

UNITED STATES PATENTS

| Number | Name | Date |
|---|---|---|
| 217,127 | Luckhardt | July 1, 1879 |
| 680,684 | Beatty | Aug. 20, 1901 |
| 1,072,481 | Melvin | Sept. 9, 1913 |
| 1,564,489 | Neil | Dec. 8, 1925 |
| 2,053,533 | Rizor | Sept. 8, 1936 |
| 2,207,176 | Phillips | July 9, 1940 |